United States Patent Office 3,535,328
Patented Oct. 20, 1970

3,535,328
CERTAIN SUBSTITUTED AMINOTHIOETHOXY PYRIDINES
James Zielinski, Kenilworth, N.J., assignor to Esso Research and Engineering Company, a corporation of Delaware
No Drawing. Filed Sept. 1, 1967, Ser. No. 664,944
Int. Cl. C07d 31/42
U.S. Cl. 260—296
52 Claims

ABSTRACT OF THE DISCLOSURE

This disclosure relates to new mono- and poly-substituted pyridine derivatives, their methods of preparation and use as pesticides. A broad classification of preferred pyridine derivatives is characterized by the following alternative formulae:

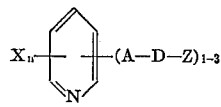

or

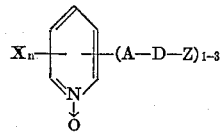

where $n$ can be an integer of from 1 to 4, and X and (A—D—Z) can occupy any ring position of from 2 to 6. When $n$ is 1, X can be hydrogen, carboxyl, imido, dialkylamino, keto, alkylthio, cycloalkyl, phosphoramido, ureido, haloalkyl such as as trihalomethyl, halogen such as chlorine, fluorine, or iodine, hydroxyl, amino, nitro, aldehydo, arylthio, alkoxyl, phenoxyl, carbamyl, alkylsulfoxide, nitrile, amido, alkylamino, nitroso, mercapto, alkyl, sulfonamido, benzyloxy, alkylsulfone, etc. When $n$ is greater than 1, X can be the same or a combination of any of the above substituents. Relative to the A—D—Z substituent, (I) A can be O, NH, NR, $NR_2$, $S(O)_{0-2}$, $CR_2O$—, $CR_2$, etc., (II) D can be any of the following: (a) $(CH_2)_{1-6}$, (b) $(CH_2)_nG(CH_2)_n$ where $n$ is 1–6 and G is NR, O, S, SO, $SO_2$, and P=O, (c)

$$(CH_2)_n(CH=CH)_n(CH_2)_n$$

where $n$ is 1 or 2, (d) $(CH_2)_n(C\equiv C)_n(CH_2)_n$ where $n$ is 1 or 2, and (e) an alkyl linkage having from 1 to 6 carbon atoms and a substituent (R) located at the terminal, or any adjacent, carbon atom; (III) and Z can be: (1) a substituted amino group of the formula

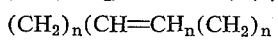

where the L moiety may or may not be the same and is defined alternatively as

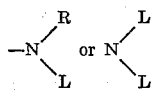

where M is NR, S, or O and R' is $NR_2$, OR, SR, or haloalkyl, or as

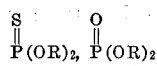

SOR, or $SO_2R$; (2) $NR_2$, $N^+R_3$, SR, or OR; (3) when X is amino, chloro, or alkoxy, and $n$ is 1, Z is NHR, $N^+R_3$, SR, or OR (A and D being as described); (4) when X is amino, chloro, bromo, alkoxy, or nitro and $n$ is 1 and A is NH, Z is NHR, $N^+R_3$, SR, or OR (D being as before); (5) when X is phenoxy and $n$ is 1 and A is $CH_2$, Z is NHR, $N^+R_3$, SR, or OR (D being as described); (6) when X is hydrogen and $n$ is 4 and A is S, Z is $NR_2$, SR, or OR; (7) O—L [L being as in (III(1))] except that A cannot be oxygen; (8) S—L [L being as in (III(1))]; and (9) phenyl, substituted phenyl, alkenyl, alkynyl, haloalkyl. The moiety R wherever it appears above is meant to include any of the following: hydrogen, alkyl, cycloalkyl, aralkyl, aryl, alkenyl, alkynyl, or substituted alkyl whose substituents are as defined by $X_n$ above.

DESCRIPTION OF THE INVENTION

This invention relates to new compositions having pesticidal activity, comprising both mono- and poly-substituted pyridine derivatives.

A number of substituted pyridine derivatives, however, are already known in the prior art. Exemplary of such known pyridine derivatives are the pyridylethyl ethers disclosed in U.S. 2,667,491; the 2-amino-6-thiohydrocarbonpyridines disclosed in U.S. 3,247,214; the poly-substituted pyridines disclosed in U.S. 3,252,858; the pyridylthiol carbonates disclosed in U.S. 3,284,459; the pyridylthiocarbamates disclosed in U.S 3,284,460; the pyridyl-phosphorodithioic acid esters disclosed in U.S. 3,304,226; the esters of pyridine di-carboxylic acids disclosed in U.S. 2,757,120; etc., however, none of the above known pyridine derivatives is suggestive of the pyridine compounds of this invention.

In accordance with one broad aspect of the present invention, there are provided novel mono- and poly-substituted amine derivatives of pyridine. Such pyridine derivates are, in general, characterized by the following general formulae:

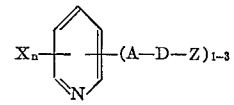

or

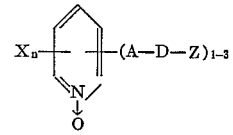

where n can be an integer of from 1 to 4, and X and (A—D—Z) can occupy any position of from 2 to 6. When $n$ is 1, X can be any of the following representative groups:

| | |
|---|---|
| hydrogen | sulfonamido |
| carboxyl | benzyloxy |
| imido | phosphoramido |
| dialkylamino | alkylsulfoxide |
| keto | chlorine |
| alkylthio | fluorine |
| cycloalkyl | amido |
| carbamyl | alkylamino |
| haloalkyl | nitroso |
| iodine | mercapto |
| hydroxyl | alkyl |
| nitro | ureido |
| aldehydo | trihalomethyl |
| arylthio | alkylsulfone |

When $n$ is greater than 1, X can be the same or a combination of any of the above substituents, particularly a combination of any of such substituents with an amino, alkoxy, bromine, chlorine or phenoxy group.

A can be O, $NR_2$, $S(O)_{0-2}$, $CR_2$—O—, $CR_2$—.

D can be (1) $(CH_2)_n$, where $n$ is 1–6; (2) $(CH_2)_nG(CH_2)_n$, where $n$ is 1–6 and G is NR, O, $S(O)_{0-2}$, P=O; (3) $(CH_2)_n(H—C\equiv C—H)_n(CH_2)_n$, where $n$ is 1 or 2; (4) $(CH_2)_n(C\equiv C)_n(CH_2)_n$, where $n$ is 1 or 2; or (5) an alkyl linkage having from 1–6 carbon atoms and a substituent (R) located at the terminal or any adjacent carbon atom.

Z can be $NR_2$, $\overset{\oplus}{NR_3}$, SR, OR. However, when X is amino, chloro, or alkoxy and $n$ is 1, Z can be NHR, $\overset{\oplus}{NR_3}$, SR, or OR (with A and D being as aforedescribed).

Alternatively, when X is amino, chloro, bromo, alkoxy or nitro and $n$ is 1 and A is NH, Z can be NHR, $\overset{\oplus}{NR_3}$, SR, or OR (with D being as aforedescribed).

Moreover, when X is phenoxy and $n$ is 1 and A is $CH_2$, Z can be NHR, $\overset{\oplus}{NR_3}$, SR, or OR (with D being as aforedescribed).

Furthermore, when X is hydrogen and $n$ is 4 and A is S, Z can be $NR_2$, SR, or OR.

The moiety R wherever it appears above is meant to include any of the following: (1) hydrogen; (2) alkyl, comprising aliphatic compounds having from 1 to 20 carbon atoms; (3) cycloalkyl, comprising hydrocarbon compounds having from 1 to 20 carbon atoms, including polycyclic systems, such as, for example, Decalines; (4) aralkyl, comprising compounds of the formula: $-(CH_2)_{2-10}-(C_6H_{1-5})-(X_n)_{1-5}$ wherein $X_n$ is as previously described; (5) aryl, comprising compounds of the formula: $-(C_6H_{1-5})-(X_n)_{1-5}$ wherein $X_n$ is as previously described; (6) alkenyl, comprising straight- or branched-compounds having from 2 to 20 carbon atoms and from 1 to 4 sites of unsaturation, at least one of those sites consisting of C=C unsaturation; (7) alkynyl, comprising straight- or branched-compounds having from 2 to 20 carbon atoms and from 1 to 4 sites of unsaturation, at least one of those sites consisting of C≡C unsaturation; and (8) substituted alkyl, comprising alkyl groups, as defined in (1), being substituted by $X_n$ type compounds previously described in a manner and/or nature well known to those skilled in the art.

Compounds illustrative and exemplary of the above-defined novel mono- and poly-substituted amine derivatives of pyridine are described and contained elsewhere herein, particularly in the examples which follow and in the tables included therein.

In accordance with another broad aspect of the present invention, there are provided novel mono- and poly-substituted amide derivatives, including benzyloxy amide derivatives, of pyridine. Such pyridine derivatives are, in general, characterized by the following general formulae:

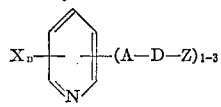

or

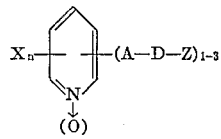

where $n$ can be an integer of from 1 to 4, and X and (A—D—Z) can occupy any position of from 2 to 6. When $n$ is 1, X can be any of the following representative groups:

| | |
|---|---|
| hydrogen | arylthio |
| carboxyl | alkoxyl |
| imido | phenoxyl |
| dialkylamino | carbamyl |
| keto | alkylsulfone |
| alkylthio | nitrile |
| cycloalkyl | amido |
| phosphoramido | alkylamino |
| ureido | nitroso |
| alkylsulfoxide | mercapto |
| halogen | alkyl |
| hydroxyl | sulfonamido |
| amino | benzyloxy |
| nitro | trihalomethyl |
| aldehydo | |

When $n$ is greater than 1, X can be the same or a combination of any of the above substituents.

A can be O, NR, $S(O)_{0-2}$, $CR_2O-$, $CR_2$.

D can be (1) $(CH_2)_n$, where $n$ is 1–6; (2)

$$(CH_2)_nG(CH_2)_n$$

where $n$ is 1–6, and G is NR, O, S, SO, $SO_2$, P=O; (3) $(CH_2)_n(CH=CH)_n(CH_2)_n$ where $n$ is 1 or 2; (4) $(CH_2)_n(C≡C)_n(CH_2)_n$, where $n$ is 1 or 2; or (5) an alkyl linkage having from 1–6 carbon atoms and a substituent (R) located at the terminal or any adjacent carbon atom.

Z can be (1) a substituted amino group of the formula

where L is

or

where the L's can be the same or different and L is

and where, in the case of both

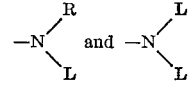

M is NR, S, or O and $R'=NR_2$, OR, SR, haloalkyl; L can also be

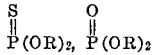

SOR, or $SO_2R$; (2) O—L (L being as just defined in (1)) except that A cannot be oxygen; (3) S—L (L being as just defined in (1)); and (4) Z=phenyl, substituted phenyl, alkenyl, alkynyl, haloalkyl.

The moiety R wherever it appears above is meant to include any of the following: (1) hydrogen; (2) alkyl, comprising aliphatic compounds having from 1 to 20 carbon atoms; (3) cycloalkyl, comprising hydrocarbon compounds having from 1 to 20 carbon atoms, including polycyclic systems, such as, for example, decalins; (4) aralkyl, comprising compounds of the formula:

$$-(CH_2)_{2-10}-(C_6H_{1-5})-(X_n)_{1-5}$$

wherein X is as previously described; (5) aryl, comprising compounds of the formula: $-(C_6H_{1-5})-(X_n)_{1-5}$ wherein $X_n$ is as previously described; (6) alkenyl, comprising straight- or branched-compounds having from 2 to 20 carbon atoms and from 1 to 4 sites of unsaturation, at least one of those sites consisting of C=C unsaturation; (7) alkynyl, comprising straight- or branched-compounds having from 2 to 20 carbon atoms and from 1 to 4 sites of unsaturation, at least one of those sites consisting of C≡C unsaturation; and (8) substituted alkyl, comprising alkyl groups, as defined in (1), being substituted by $X_n$ type compounds previously described in a manner and/or nature well known to those skilled in the art.

Compounds illustrative and exemplary of the above-defined novel mono- and poly-substituted amide derivatives of pyridine are described and contained elsewhere herein, particularly in the examples which follow and in the tables included therein.

In accordance with a specific embodiment of the present invention, there are provided novel mono- and poly-substituted pyridine derivatives which can be generally classified as (I) aminoalkoxy, aminoalkenoxy, or aminoalkynoxy pyridines and (II) amidoalkoxy, amidoalkenoxy, or amidoalkynoxy pyridines. Such pyridine derivatives can be characterized by the following general formulae:

(I)
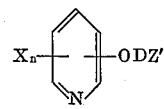

where $X_n$ and D are as previously defined and Z' is $NH_2$, $NR_2$, or $N^+R_3$, with R being as previously defined.

(II)
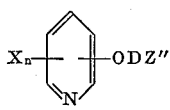

where $X_n$ and D are as previously defined and Z is a substituted amino group of the formula $$-N\begin{matrix}R\\L\end{matrix} \quad \text{or} \quad N\begin{matrix}L\\L\end{matrix}$$

where L is

and R' is $NR_2$ and M is NR or O, with R as previously defined.

In accordance with another specific embodiment of the present invention, there are provided novel mono- and poly-substituted pyridine derivatives of the following general formula:

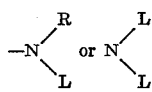

where $X_n$, D and Z are as previously defined except that $X_n$ may occupy only the positions 2, 3, 4, and/or 5 and ODZ may only occupy the 6-position.

In accordance with another specific embodiment of the present invention, there are provided novel di-substituted pyridine derivatives of the following general formula:

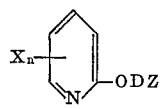

where X and D and Z are as previously defined.

In accordance with another specific embodiment of the present invention, there are provided novel di-substituted pyridine derivatives of the following general formula:

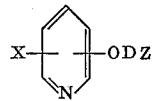

where X and D and Z are as previously defined.

In accordance with another specific embodiment of the present invention, there are provided novel 2,6-di-substituted pyridine derivatives of the following general formula:

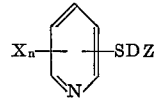

where X and D and Z are as previously defined.

In accordance with still another specific embodiment of the present invention, there are provided novel 2,6-di-substituted pyridine derivatives of the following general formula:

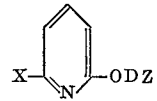

where X, D, and R are as previously defined.

In accordance with yet another specific embodiment of the present invention, there are provided novel 2,6-di-substituted pyridine derivatives of the following general formula:

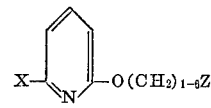

where X and Z are as previously defined.

Also in accordance with this invention is provided a number of different processes for preparation of the new compounds set forth hereinabove. For example, by means of the following four methods of synthesis, the aforementioned amine derivatives of this invention may be prepared.

Method A (utilizing a 2-, 4-, and/or 6-halopyridine reactant):

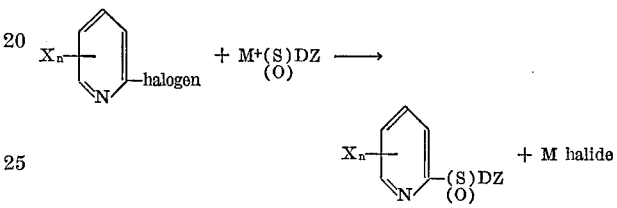

Method B (utilizing a 2-, 4-, and/or 6-halopyridine reactant):

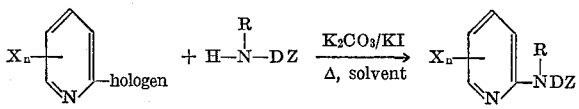

Method C (utilizing a 3-, and/or 5-substituted pyridine reactant):

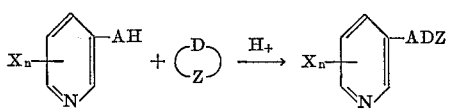

Method D:

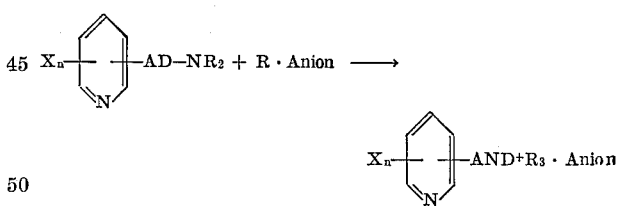

By means of the following five methods of synthesis, moreover, the aforementioned amide derivatives of this invention may be prepared.

Method E:

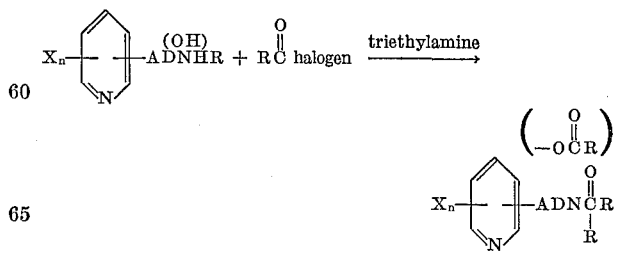

Method F:

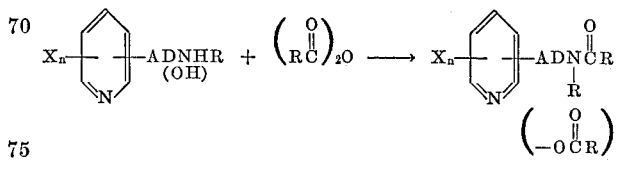

Method G:

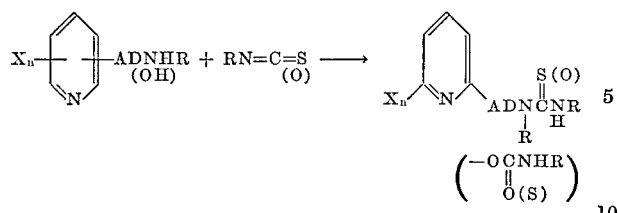

Method H:

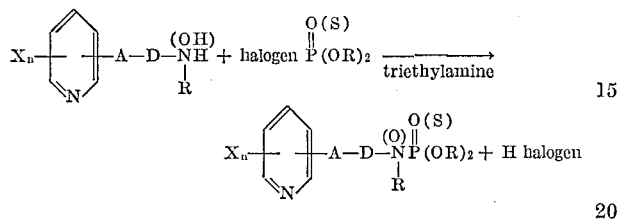

Method I:

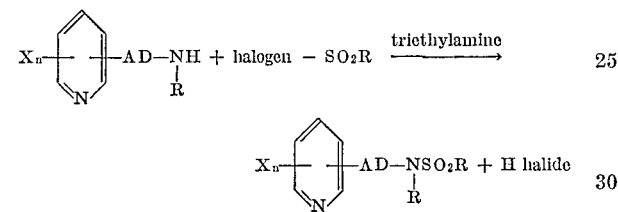

In addition to the foregoing preparative methods set forth hereinabove, an additional method for preparing the N-oxide form of the final product shown above can be set forth, for example, as follows:

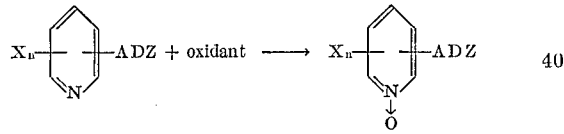

In general, the preparative methods for producing the pyridine derivatives of this invention involve nucleophilic displacement of an appropriate displaceable group from a suitable substituted pyridine. The general reaction conditions for these methods of preparation of the various substituted pyridine derivatives of this invention comprise temperatures ranging from about 0° C. to about 200° C., preferably from about 80° C. to about 130° C. The reaction time may vary from about 1 to about 48 hours, depending upon the choice of reactants and the reaction conditions, but may take as long as about 72 hours. Ordinarily, however, the reaction should take no longer than about 12 hours. Various solvents useful in the foregoing methods of preparation include such as toluene, benzene, xylene, dimethylformamide, triethylamine, etc.

Exemplary of the foregoing mono- and poly-substituted amine and amide pyridine derivatives of this invention are the following compounds, represented by their structural formulae (this list is only representative and is not, by any means, intended to be exhaustive):

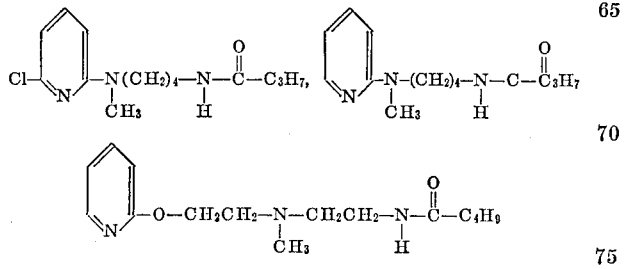

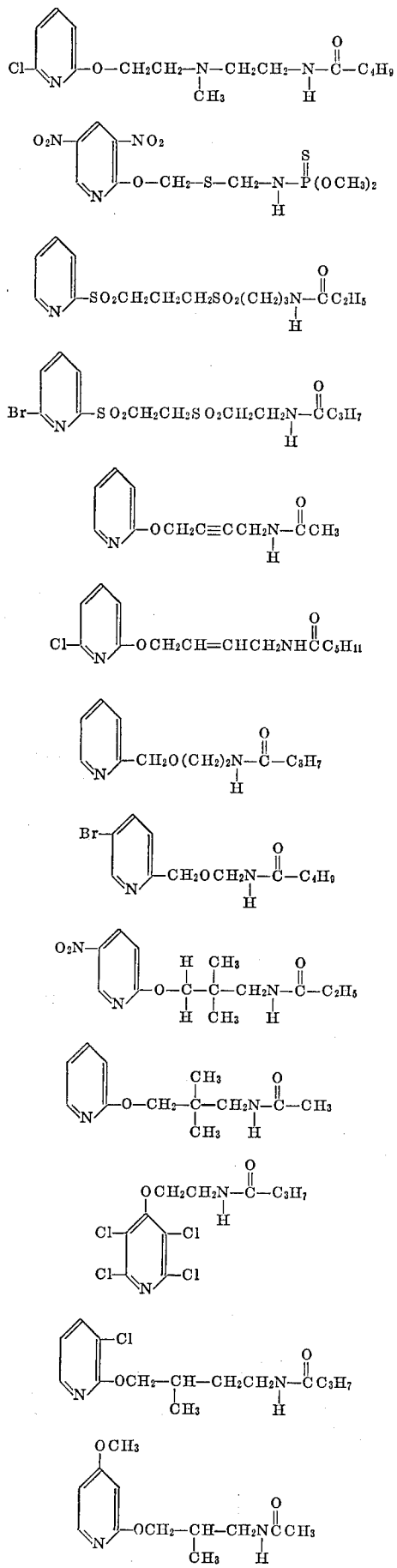

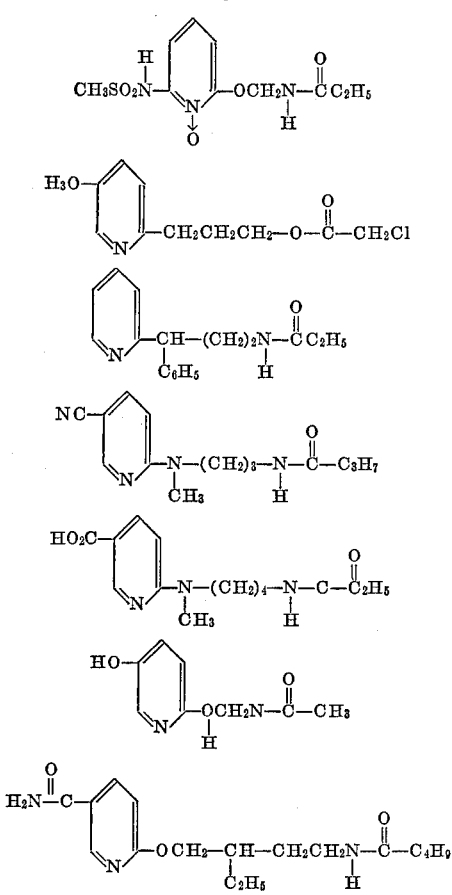

etc.

As previously noted, the mono-substituted and poly-substituted pyridine derivatives of this invention are useful as pesticides. One aspect of such pesticidal application is as a herbicide, either pre-emergent or post-emergent, or as a fungicide. When used as a fungicide or herbicide, the compositions of this invention may be used to control plant growth or fungi thereon by either applying to foliage or plant growth media, a growth- or fungi-controlling dosage of the mono- or poly-substituted pyridine compound or of concentrated compositions prepared by bringing the aforesaid compound (as an active ingredient) in intimate admixture with at least one material of the group consisting of finely-divided inert solids, granular solids, surface active dispersing agents, poly-glycols beeswax, paraffin waxes, water, organic solvents, nitrogen fertilizers, potassium fertilizers, urea, metaphosphates, etc. Particularly contemplated as desirable concentrate compositions are those which comprise the aforesaid mono- or poly-substituted pyridine compounds as active ingredient in intimate admixture with at least one material of the group consisting of finely-divided inert solids, inert granular solids, and surface active dispersing agents. Another type of useful concentrate composition contemplated according to this invention is the aqueous concentrate composition comprising an aforesaid pyridine derivative as an amine salt.

The expression "surface active dispersing agent" as herein employed is intended to include all agents which are capable of acting at the interfacial surface between the aforesaid pyridine derivative or composition and water or organic solvents as the dispersion medium, facilitating thereby the dispersion of the toxicant in water or organic solvents to form aqueous and emulsifiable concentrate. The term is inclusive of solid emulsifying agents such as finely divided bentonite, pyrophyllite, fuller's earth, attapulgite, silica, other clays and mineral carriers, as well as liquid and solid ionic and non-ionic wetting and dispersing agents, alkaline earth metal caseinates, alkyl aryl sulfonates, sulfonated oils, complex organic ester derivatives, complex ether alcohols, condensation products of alkylene oxides with phenols and organic acids, poly-oxy ethylene derivatives of Sorbitan esters, mahogany soaps, etc.

Other suitable surface active dispersing agents may be found in "Detergents and Emulsifiers, Up to Date," written and published by John W. McCutcheon, Inc., New York, 1962.

The term "finely divided inert solids" as herein employed refers to material whose primary function is not as dispersant of the present pyridine derivatives in water or organic solvents but as carrier for dust compositions. Illustrative of such carriers are materials such as chalk, talc, gypsum, etc.

The term "inert granular solids" refers to mineral or other inert carriers which are suitable for dry application and which include corn cobs, sand, and other materials which differ primarily in particle size from the "finely divided inert solids."

According to the present invention, any of the appropriate mono- or poly-substituted pyridine derivatives disclosed herein may be compounded with any of the finely divided solids to form dust compositions by grinding, mixing or wetting the finely divided carrier with a solution of the toxicant in a volatile organic solvent. Similarly, dust compositions containing the aforesaid pyridine derivatives may be compounded from any one or more of the solid surface active dispersing agents previously mentioned, such as bentonite, fuller's earth, attapulgite and other clays. Depending upon the proportions of ingredients, these dust mixtures may be employed either as treating compositions or as concentrates to be subsequently diluted with additional solid surface active dispersing agent or with talc, chalk, gypsum, etc., to obtain the desired amount of toxicant in a composition adapted to be applied to plants, plant growth media or fungi thereon, for the suppression of plant growth or said fungi. Also, such concentrate dust compositions may be dispersed in water or organic solvent with or without the aid of additional dispersing or emulsifying agents to form spray mixtures.

Dust concentrates, such as above-described, or alternatively appropriate mono- or poly-substituted pyridine compounds may be intimately mixed with liquid or solid ionic or non-ionic dispersing agents to form spray concentrates. Such concentrates are readily dispersible in liquid carriers to form sprays containing the mono- or poly-substituted pyridine derivatives in any desired amount.

Any of the mono- or poly-substituted pyridine compounds of this invention may also be compounded with suitable water-miscible or water-immiscible organic liquid and surface active dispersing agents to produce liquid concentrates which may be further formulated with water and/or oil to prepare spray mixtures in the form of aqueous dispersions or oil-in-water emulsion compositions. The exact step to be employed in preparing such compositions is within the knowledge of those skilled in the art. Preferred water-immiscible organic liquids include petroleum oil and distillates, toluene, xylene, cumene and other aromatic hydrocarbon solvents, chlorinated aliphatic hydrocarbons, isoparaffin oil and other aliphatic hydrocarbon solvents. Water-miscible organic solvents include acetone, methylethyl ketone, cyclohexanone, alcohols, dimethyl fomamide, ether alcohols of ethylene glycol marketed under trade names such as Dowanol and Cellosolve, and esters such as ethyl acetate, secondary butyl acetate and isopropyl acetate. When the aforesaid pyridine derivatives of this invention are alkali metal, ammonium or amine salts, aqueous concentrate compositions are readily prepared. The salts may be first compounded in a water-miscible organic solvent and added to a minimal amount of water, or they may be directly compounded in water or in a water-organic solvent mixture. Usually, the use of a procedure which includes addition of a small amount of a water-miscible organic solvent is preferred. Moreover, in the case of salt compositions, the salt need not be performed but may be prepared during the compounding process. Thus, the desired mono- or poly-substituted pyridine compound and desired amine or inorganic base may be mixed together in appropriate amounts in an aqueous organic solvent mixture.

The present compositions may also contain other plant growth modifying agents either as adjuvants or supplementary materials for both terrestrial and aquatic applications.

In carrying out the methods of the present invention, as they pertain to the control of fungi or of plant growth or vegetation, the mono- or poly-substituted pyridine compounds of this invention are administered to foliage, plant parts or growth media of the plant species whose pesticide control is desired. The exact amount to be administered varies with the particular type of growth control to be achieved. It further varies with method of application i.e., whether the application is to be made to foliage, food, flower, or particular plant part, or to soil or other growth media, and the overall site of application: a sheltered area, such as a greenhouse; or an exposed area, such as fields, etc. Thus, as for example, in the treatment of grass and weeds, soil application is preferred to foliage application and the amounts are governed thereby. Also, weeds present in sheltered areas are more responsive to treatment and minimal dosages are usually adequate whereas field applications often times require higher dosages to counteract adverse weather effects. An additional factor to be considered is the plant species to be treated, as well as the presence or absence of desirable plants together with the undesirable species. Thus, selective grass control may be achieved by administering sufficient pyridine derivaties of this invention to irradicate grasses without affecting broad leaf.

Effective control of terrestrial plants in soil may be readily achieved by the administration of various pyridine derivatives of this invention.

The administration of the present compounds or compositions thereof to plant or plant growth media may be carried out in any manner known to those skilled in the art and may be carried out by using dust compositions, sprays or any other modification provided that an effective dosage is supplied. It is to be understood that the total volume or weight of the treating compositions to be employed is not critical so long as the critical amount of the aforesaid pyridine compounds is supplied. Frequently, the desirability of a more concentrated or dilute composition depends upon the method of application and the area to be covered; hence, the selection of the concentration and total volume or weight may be made by those of ordinary skill in the art of the foregoing teachings.

While the aforementioned discussion has focused upon the use of the aforesaid pyridine compounds of this invention as fungicides or herbicides, they may also be used as nematocides or insecticides by formulating said insecticides or nematocides from said mono- or poly-substituted pyridine compounds of this invention in any suitable form, such as: a solution, dust, emulsion, suspension, aerosol, fog or the like, or as a pure compound. Solvents or carriers found suitable in this regard include those which are substantially inert with respect to the active repellent ingredient. Among these materials, which are useful for this purpose, are acetone, kerosene, naphtha, and other liquid hydrocarbons boiling preferably above atmospheric temperature. Solid inert carrier materials are also contemplated and utilized, such as, for example, talc, kieselguhr, and other inert carriers, when preparing dust. The active insect repellent or nematocide ingredients of this invention may be applied in the form of an aqueous emulsion or dispersion preferably when employing a wetting or dispersing agent, as, for example, Triton X–100 (an alkylated aryl polyether alcohol), Tween 20 (a sorbitan monolaurate polyoxyethylene derivative), etc. In some instances, the active ingredient can be as advantageously applied as the pure compound without a carrier of any kind.

The present invention is further illustrated in greater detail by the following examples, but it is to be understood that the present invention, in its broadest aspects, is not necessarily limited in terms of the specific temperatures, residence times, separation techniques, and other process conditions by which the compounds and/or compositions described and claimed are prepared and used.

In the following examples, the compounds prepared in Examples 1–84 are included in Tables I(a) and I(b) and the nomenclature of each of the compounds included in Examples 1–84 is included in Table I(c). The compounds prepared in Examples 85–148 and the nomenclature thereof are included in Table II(a). The methods of preparation by which each of the compounds shown in Examples 1–148 is prepared as designated alphabetically from A–I inclusive. The general experimental procedures of Methods A–I are included herebelow.

EXPERIMENTAL PROCEDURES

Method A

The metal salt of the appropriate alcohol or thioalcohol was combined with a solution of the properly substituted 2, 4 or 6 mono-, di- or tri-halo pyridine in an appropriate solvent (toluene, xylene, dimethylformamide) and heated to reflux for from 2 to 48 hours, filtered and evaporated to yield a material which whenever possible was either distilled or crystallized to yield the desired product.

Method B

The amine compound was combined with a solution of the properly substituted 2, 4 or 6 mono-, di- or trihalopyridine in an appropriate solvent (toluene, xylene, dimethylformamide) containing potassium carbonate and potassium iodide and heated at reflux for from 2 to 48 hours, filtered, evaporated and the resulting material either distilled or crystallized to yield the desired product.

Method C

The appropriate 3 or 5 mono- or disubstituted pyridine was heated with the appropriate cyclic molecule in the proper solvent in the presence of acid for from 2 to 48 hours. The solution was neutralized and evaporated to yield a material which whenever possible was distilled or crystallized to yield the desired product.

Method D

The appropriate pyridylamine was combined with the proper alkylating agent in an inert solvent such as ether, benzene, acetone, etc. The precipitated product was then removed by filtration and whenever possible crystallized to yield the desired derivative.

Method E

The appropriate acyl halide was added as a solution or in its pure state dropwise to a solution containing the pyridylamine or alcohol and triethylamine in the appropriate solvent (ether, benzene, toluene, acetone, etc.) maintained from —40 to 0° C. The reaction was allowed to be stirred at room temperature or refluxed from 2 to 48 hours, filtered and the resulting solution evaporated and whenever possible the product was crystallized from an appropriate solvent or distilled to yield the desired product.

Method F

The appropriate pyridyl alcohol or amine, and anhydride were combined in the proper solvent (ether, benzene, toluene, etc.) and refluxed from 2 to 48 hours, washed with base and evaporated to yield a product which whenever possible was crystallized or distilled to yield the desired product.

Method G

The appropriate isocyanate or isothiocyanate was added dropwise in solution or in its pure state to a solution of the pyridyl amine or alcohol in the proper solvent (ether, benzene, toluene, etc.) and after the exothermic reaction subsided the solution or suspension was refluxed from 2 to 48 hours and the solvent removed under vacuum to yield a product which whenever possible was crystallized to yield the proper derivative.

Method H

The appropriate halophosphate or halothiophosphate was added dropwise in its pure state or as a solution at room temperature to a solution of the pyridyl amine or alcohol and triethylamine in the proper solvent (ether, toluene, xylene, etc.) and after the usual exothermic reaction brought to reflux from 2 to 48 hours, filtered, evaporated and whenever possible the product was either distilled or crystallized to yield the desired derivative.

Method I

The appropriate sulfonyl halide was added to Method E.

TABLE I(a)

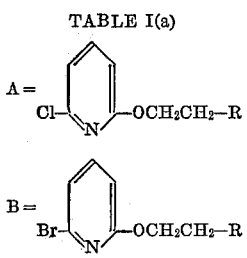

| Example No. | Compound | R | Method of prep. | Phys. prop., °C. |
|---|---|---|---|---|
| 1 | A | NHCHO | E | S, 63-64 |
| 2 | B | NHCHO | E | S, 70-71 |
| 3 | A | NHCOCH$_3$ | F | S, 73-74 |
| 4 | B | NHCOCH$_3$ | F | S, 73 |
| 5 | A | NHCOCH$_2$CH$_3$ | F | S, 76-78 |
| 6 | B | NHCOCH$_2$CH$_3$ | F | S, 83 |
| 7 | A | NHCOCH$_2$CH$_2$CH$_3$ | F | S, 54-46 |
| 8 | B | NHCOCH$_2$CH$_2$CH$_3$ | F | S, 73 |
| 9 | A | NHCO-cyclopropyl | E | S, 127-129 |
| 10 | B | NHCO-cyclopropyl | E | S, 130-134 |
| 11 | A | NHCO—CH(CH$_3$)$_2$ | F | S, 97-98 |
| 12 | B | NHCO—CH(CH$_3$)$_2$ | F | S, 112-114 |

TABLE I(a)—Continued

| Example No. | Compound | R | Method of prep. | Phys. prop., °C. |
|---|---|---|---|---|
| 13 | A | NHCOC(CH$_3$)C$_3$H$_7$ | E | S, 72-76 |
| 14 | B | NHCOC(CH$_3$)C$_3$H$_7$ | E | S, 92-94 |
| 15 | A | NHCO(CH$_2$)$_8$C—H$_3$ | E | S, 57-59 |
| 16 | B | NHCO(CH$_2$)$_8$C—H$_3$ | E | S, 63-65 |
| 17 | A | —NHCO-(thienyl) | E | S, 124-126 |
| 18 | B | —NHCO-(thienyl) | E | S, 131-133 |
| 19 | A | —NHCO-(thienyl) | E | S, 102-103 |
| 20 | B | —NHCO-(thienyl) | E | S, 124-125 |
| 21 | A | NHCOCH$_2$Cl | E | S, 73-75 |
| 22 | B | NHCOCH$_2$Cl | E | S, 78-80 |
| 23 | A | NHCOCCl$_3$ | E | S, 47-50 |
| 24 | B | NHCOCCl$_3$ | E | S, |
| 25 | A | NHCOCH=CHφ | E | S, 127-129 |
| 26 | B | NHCOCH=CHφ | E | S, 112-114 |
| 27 | A | NHCOφ | E | S, 103-104 |
| 28 | B | NHCOφ | E | S, 99-101 |
| 29 | A | NHCOOCH(CH$_3$)$_2$ | E | S, 58-62 |
| 30 | B | NHCOOCH(CH$_3$)$_2$ | E | S, 54-55 |
| 31 | A | NHCN(CH$_3$)$_2$ | E | S, 171-174 |
| 32 | B | NHCN(CH$_3$)$_2$ | E | S, 60-62 |
| 33 | A | NHCNHCH$_3$ | G | S, 138-140 |
| 34 | B | NHCNHCH$_3$ | G | S, 146-149 |
| 35 | A | N(CH$_3$)CNHCH$_3$ | G | S, 71-73 |
| 36 | B | N(CH$_3$)CNHCH$_3$ | G | S, 85-86 |
| 37 | A | NHCNHφ | G | S, 133-136 |

TABLE I(a)—Continued

| Example No. | Compound | R | Method of prep. | Phys. prop., °C. |
|---|---|---|---|---|
| 38 | B | NHC(O)NHφ | G | S, 143–145 |
| 39 | A | N(CH$_3$)C(O)NHφ | G | S, 55–59 |
| 40 | B | N(CH$_3$)C(O)NHφ | G | S, 68–69 |
| 41 | A | NHC(O)CH$_2$CH$_2$COOH | F | S, 94–96 |
| 42 | B | NHC(O)CH$_2$CH$_2$COOH | F | S, 123–125 |
| 43 | A | HNSO$_2$CH$_2$CH$_2$CH$_3$ | I | S, 70–72 |
| 44 | B | HNSO$_2$CH$_2$CH$_2$CH$_3$ | I | S, 60–61 |
| 45 | A | HNSO$_2$φ | I | S, 56–58 |
| 46 | B | HNSO$_2$φ | I | S, 75–76 |
| 47 | A | HNSO$_2$φCH$_3$ | I | S, 90–92 |
| 48 | B | HNSO$_2$φCH$_3$ | I | S, 116–118 |
| 49 | A | NHC(O)C(CH$_3$)=CH$_2$ | E | S, 83–85 |
| 50 | B | NHC(O)C(CH$_3$)=CH$_2$ | E | S, 57–59 |
| 51 | A | NHP(S)(OEt)$_2$ | H | S, 38–41 |
| 52 | B | NHP(S)(OEt)$_2$ | H | S, 48–50 |
| 53 | A | NHP(O)(OEt)$_2$ | H | L, oil |
| 54 | B | NHP(O)(OEt)$_2$ | H | S, 36–39 |

Note.—S=Solid; L=Liquid.

TABLE I(b)

| Example No. | Compound | Method of prep. | Phys. prop., °C. |
|---|---|---|---|
| 55 | Cl-pyridyl-OCH$_2$CH$_2$OCH$_2$CH$_2$NHC(O)C$_3$H$_7$ | F | S, 60–62. |
| 56 | I-pyridyl-OCH$_2$CH$_2$NHC(O)C$_3$H$_7$ | F | L, thick oil. |
| 57 | 3-NO$_2$-pyridyl-O(CH$_2$)$_2$NHC(O)C$_3$H$_7$ | A | Do. |
| 58 | 5-NO$_2$-pyridyl-O(CH$_2$)$_2$NHC(O)C$_3$H$_7$ | A | S, 91–93. |
| 59 | C$_2$H$_5$O-pyridyl-OCH$_2$CH$_2$NHC(O)C$_3$H$_7$ | F | S, 73–74. |
| 60 | Cl-pyridyl-OCH$_2$C(CH$_3$)$_2$-NHC(O)C$_3$H$_7$ | F | L, thick oil. |
| 61 | Cl-pyridyl-O(CH$_2$)$_4$NHC(O)C$_3$H$_7$ | F | S, 38–39. |
| 62 | Cl-pyridyl-OCH(φ)CH$_2$NHC(O)C$_3$H$_7$ | F | L, oil. |
| 63 | Br-pyridyl-OCH(φ)CH$_2$NHC(O)C$_3$H$_7$ | F | Do. |
| 64 | CH$_3$-pyridyl-OCH$_2$CH$_2$NHC(O)C$_3$H$_7$ | F | Do. |

TABLE I(b)—Continued

| Example No. | Compound | Method of prep. | Phys. prop., °C. |
|---|---|---|---|
| 65 | Br-pyridine-CH₂C(CH₃)₂NHCOC₃H₇ | F | Do. |
| 66 | 5-Cl-pyridine-OCH₂CH₂NHCOC₃H₇ | F | L, 83–84. |
| 67 | 5-Br-pyridine-OCH₂CH₂NHCOC₃H₇ | F | L, 79–82. |
| 68 | 3-Cl-pyridine-OCH₂CH₂NHCOC₃H₇ | E | L, oil. |
| 69 | 6-Cl-pyridine-OCH(CH₃)CH₂NHCOC₃H₇ | F | S, 68–71. |
| 70 | 6-Br-pyridine-OCH(CH₃)CH₂NHCOC₃H₇ | F | S, 73–74. |
| 71 | 6-NH₂-pyridine-OCH₂CH₂NHCOC₃H₇ | A | L, oil. |
| 72 | Cl-pyridine-NH(CH₂)₃OCOCH₂CH₃ | F | Do. |
| 73 | Br-pyridine-O(CH₂)₃NHCOC₃H₇ | F | S, 197–202. |
| 74 | pyridine-OCH₂CH₂NHCOC₃H₇ | F | L, oil. |
| 75 | Cl-pyridine-OCH₂CH=CH₂ | A | L, 60–66.¹ |
| 76 | Cl-pyridine-OCH₂C≡CH | A | L, 65–72.² |
| 77 | Cl-pyridine-OCH₂φ | A | L, 111–114.³ |
| 78 | Cl-pyridine-OCH₂CH₂φ | A | L, 125–133.² |

TABLE I(b)—Continued

| Example No. | Compound | Method of prep. | Phys. prop., °C. |
|---|---|---|---|
| 79 | 2-ethoxy-6-(2-phenylethoxy)pyridine: $C_2H_5O$—(pyridine)—$OCH_2CH_2\phi$ | A | L, 124-133.[3] |
| 80 | 2-chloro-6-(benzylamino)pyridine: $Cl$—(pyridine)—$NHCH_2\phi$ | A | S, 89-91. |
| 81 | 2-ethoxy-6-(benzyloxy)pyridine: $C_2H_5O$—(pyridine)—$OCH_2\phi$ | A | L, 109.[4] |
| 82 | 2,6-bis(benzyloxy)pyridine: $\phi CH_2O$—(pyridine)—$OCH_2\phi$ | A | S, 74-75. |
| 83 | 3,5-dibromo-2,6-bis(benzyloxy)pyridine: Br—(pyridine, $\phi CH_2O$, $OCH_2\phi$)—Br | A | S, 72-73. |
| 84 | 2-chloro-6-(benzylthio)pyridine: $Cl$—(pyridine)—$SCH_2\phi$ | A | L, 145-160.[5] |

[1] At 1.0 mm.
[2] At 0.5 mm.
[3] At 0.3 mm.
[4] At 0.025 mm.
[5] At 0.1–.5 mm.

NOTE.—S = Solid; L = Liquid.

TABLE I(c)

2-chloro-6(2-formamidoethoxy)pyridine
2-bromo-6(2-formamidoethoxy)pyridine
2-chloro-6(2-acetamidoethoxy)pyridine
2-bromo-6(2-acetamidoethoxy)pyridine
2-chloro-6(2-propionamidoethoxy)pyridine
2-bromo-6(2-propionamidoethoxy)pyridine
2-chloro-6(2-butyramidoethoxy)pyridine
2-bromo-6(2-butyramidoethoxy)pyridine
2-chloro-6(2-cyclopropylcarboxamidoethoxy)pyridine
2-bromo-6(2-cyclopropylcarboxamidoethoxy)pyridine
2-chloro-6(2-isobutyramidoethoxy)pyridine
2-bromo-6(2-isobutyramidoethoxy)pyridine
2-chloro-6(2-decanamidoethoxy)pyridine
2-bromo-6(2-decanamidoethoxy)pyridine
2-chloro-6(2-cyclohexylcarboxamidoethoxy)pyridine
2-bromo-6(2-cyclohexylcarboxamidoethoxy)pyridine
2-chloro-6[2(1-methylvaleramido)ethoxy]pyridine
2-bromo-6[2(1-methylvaleramido)ethoxy]pyridine
2-chloro-6(2-cyclobutylcarboxamidoethoxy)pyridine
2-bromo-6(2-cyclobutylcarboxamidoethoxy)pyridine
2-chloro-6[2(1-chloroacetamido)ethoxy]pyridine
2-bromo-6[2(1-chloroacetamido)ethoxy]pyridine
2-chloro-6[2(1,1,1-trichloroacetamido)ethoxy]pyridine
2-bromo-6[2(1,1,1-trichloroacetamido)ethoxy]pyridine
2-chloro-6(2-cinnamidoethoxy)pyridine
2-bromo-6(2-cinnamidoethoxy)pyridine
2-chloro-6(2-benzamidoethoxy)pyridine
2-bromo-6(2-benzamidoethoxy)pyridine
2-chloro-6(2-isopropoxycarboxamidoethoxy)pyridine
2-bromo-6(2-isopropoxycarboxamidoethoxy)pyridine
2-chloro-6(2-dimethylaminocarboxamidoethoxy)pyridine
2-bromo-6(2-dimethylaminocarboxamidoethoxy)pyridine
2-chloro-6(2-methylaminocarboxamidoethoxy)pyridine
2-bromo-6(2-methylaminocarboxamidoethoxy)pyridine
2-chloro-6[2-methylamino(N-methyl)carboxamidoethoxy]pyridine
2-bromo-6[2-methylamino(N-methyl)carboxamidoethoxy]pyridine
2-chloro-6(2-anilinocarboxamidoethoxy)pyridine
2-bromo-6(2-anilinocarboxamidoethoxy)pyridine
2-chloro-6(2-succinamidoethoxy)pyridine
2-bromo-6(2-succinamidoethoxy)pyridine
2-chloro-6(2-propanesulfonamidoethoxy)pyridine
2-bromo-6(2-propanesulfonamidoethoxy)pyridine
2-chloro-6(2-benzenesulfonamidoethoxy)pyridine
2-bromo-6(2-benzenesulfonamidoethoxy)pyridine
2-chloro-6[2(4-methylbenzenesulfonamido)ethoxy]pyridine
2-bromo-6[2(4-methylbenzenesulfonamido)ethoxy]pyridine
2-chloro-6[2-anilino(N-methyl)carboxamidoethoxy]pyridine
2-bromo-6[2-anilino(N-methyl)carboxamidoethoxy]pyridine
2-chloro-6(2-methacrylamidoethoxy)pyridine
2-bromo-6(2-methacrylamidoethoxy)pyridine
2-chloro-6(2-diethoxythiophosphoramidoethoxy)pyridine
2-bromo-6(2-diethoxythiophosphoramidoethoxy)pyridine
2-chloro-6(2-diethoxyphosphoramidoethoxy)pyridine
2-bromo-6(2-diethoxyphosphoramidoethoxy)pyridine
2-chloro-6-[2(2-butyramidoethoxy)ethoxy]pyridine
2-(2-butyramidoethoxy)-5-iodopyridine
2-(2-butyramidoethoxy)-3-nitropyridine
2-(2-butyramidoethoxy)-5-nitropyridine
2-ethoxy-6-(2-butyramidoethoxy)pyridine
2-chloro-6(2-butyramido-2-methylpropoxy)pyridine
2-chloro-6(4-butyramidobutoxy)pyridine
2-chloro-6(1-phenyl-2-butyramidoethoxy)pyridine
2-bromo-6(1-phenyl-2-butyramidoethoxy)pyridine
2-methyl-6(2-butyramidoethoxy)pyridine
2-bromo-6(2-butyramido-2-methylpropoxy)pyridine
2-(2-butyramidoethoxy)-5-chloropyridine
2-(2-butyramidoethoxy)-5-bromopyridine
2-(2-butyramidoethoxy)-3-chloropyridine
2-chloro-6(2-butyramidoisopropoxy)pyridine
2-bromo-6(2-butyramidoisopropoxy)pyridine

TABLE I(c)—Continued 2-amino-6(2-butyramidoethoxy)pyridine
2-chloro-6(3-propionyloxy propylamino)pyridine
2-bromo-6(3-butyramidopropoxy)pyridine
2-(2-butyramidoethoxy)pyridine
2-chloro-6-allyloxypyridine
2-chloro-6-propargyloxypyridine
2-chloro-6-benzyloxypyridine
2-chloro-6(2-phenylethoxy)pyridine
2-ethoxy-6(2-phenylethoxy)pyridine
2-chloro-6-benzylamino pyridine
2-ethoxy-6-benzyloxypyridine
2,6-dibenzyloxypyridine
3,5-dibromo-2,6-dibenzyloxypyridine
2-chloro-6-benzylthiopyridine

TABLE II(a)

| Example No. | Compound formula | Name | S=Solid, L=Liquid Phys. Prop., °C. | Method |
|---|---|---|---|---|
| 85 | Cl—[pyridine]—NH(CH$_2$)$_3$OCH$_3$ | 2-chloro-6(2-methoxy propylamino)pyridine | L, 104–109 at 0.05 mm | B |
| 86 | Cl—[pyridine]—NHCH$_2$CH$_2$OH | 2-chloro-6(2-hydroxy ethylamino)pyridine | L, 149–154 at 0.3 mm | B |
| 87 | EtO—[pyridine]—O(CH$_2$)$_2$N$^\oplus$(CH$_3$)$_3$·I$^\ominus$ | 2-ethoxy-6(2-trimethyl aminoethoxy)pyridine iodide. | S, 197–202 | D |
| 88 | MeO—[pyridine]—O(CH$_2$)$_2$NHCH$_3$ | 2 methoxy-6(2-methylamino ethoxy)pyridine | L, 77–79 at 0.1 mm | A |
| 89 | Cl—[pyridine]—OCH$_2$CH$_2$NH$_2$ | 2-chloro-6(2aminoethoxy)pyridine | L, 95–100 at 0.01 mm | A |
| 90 | C$_2$H$_5$O—[pyridine]—OCH$_2$CH$_2$NH$_2$ | 2-ethoxy-6(2-aminoethoxy)pyridine | L, 85–87 at 0.01 mm | A |
| 91 | Cl—[pyridine]—NH(CH$_2$)$_3$OH | 2-chloro-6-(3-hydroxypropyl-amino)pyridine | S, 86–89 | B |
| 92 | [pyridine with 2,6-di O(CH$_2$)$_2$N(CH$_3$)$_3$$^\oplus$·I$^\ominus$] | 2,6-di(2-trimethylaminoethoxy)pyridine diiodide. | S, 255–258 | D |
| 93 | Br—[pyridine]—N(H)—(CH$_2$)$_2$OC$_2$H$_5$ | 2-bromo-6-(2-ethoxyethylamino)pyridine | L, 108–113 at 0.075 mm | B |
| 94 | [2-Br pyridine]-6-O(CH$_2$)$_2$N(H)CH$_3$ | 2-bromo-6(2-methylaminoethoxy)pyridine | L, 85–98 at 0.075 mm | A |
| 95 | CH$_3$O(CH$_2$)$_3$—N(H)—[pyridine]—Br | 2-bromo-6(3-methoxypropylamino)pyridine | L, 115 at 0.025 mm | B |
| 96 | (CH$_3$)$_2$NCH$_2$CH$_2$O—[pyridine]—OCH$_2$CH$_2$N(CH$_3$)$_2$ | 2,6-di(2-dimethylaminoethoxy)pyridine | L, 126–135 at 0.2 mm | A |
| 97 | (CH$_3$)$_2$NCH$_2$CH$_2$CH$_2$O—[pyridine]—OCH$_2$CH$_2$CH$_2$N(CH$_3$)$_2$ | 2,6-di(3-dimethylaminopropyloxy)pyridine | L, 150–151 at 0.1 mm | A |

TABLE II(a)—Continued

| Example No. | Compound formula | Name | S=Solid, L=Liquid Phys. Prop., °C. | Method |
|---|---|---|---|---|
| 98 | (structure) | 2,6-di(2-methylaminoethoxy)pyridine | L, 125–131 at 0.01 mm | A |
| 99 | (structure) | 2,6-di(2-aminoethoxy)pyridine | L, 136–138 at 0.2 mm | A |
| 100 | (structure) | 2-ethoxy-6(2-methylamino ethoxy)pyridine | L, 96–100 at 0.05 mm | A |
| 101 | (structure) | 2,6-di-(2-N-aziridylethoxy)pyridine | L, oil | A |
| 102 | (structure) | 2-(1-phenyl-2-N-aziridylethoxy)pyridine | L, 126–130 at 0.1 mm | A |
| 103 | (structure) | 4-(2-dimethylamino-ethoxy)pyridine | L, 90–93 at 0.1 mm | A |
| 104 | (structure) | 2-(2-N-aziridylcyclohexyloxy)pyridine | L, 107 at 0.1 mm | A |
| 105 | (structure) | 2-[1-phenyl-2(2,2-dimethyl-N-aziridyl)ethoxy]-pyridine. | L, undistilled | A |
| 106 | (structure) | 2-(1-phenoxy-3-N-aziridyl-2-propyloxy)-pyridine. | do | A |
| 107 | (structure) | 2-(1-N-aziridyl-2-propyloxy)pyridine | do | A |
| 108 | (structure) | 2-(2-N-aziridylethoxy) pyridine | do | A |

TABLE II(a)—Continued

| Example No. | Compound formula | Name | S=Solid, L=Liquid Phys. Prop., °C. | Method |
|---|---|---|---|---|
| 109 | pyridine-OCH$_2$CH$_2$NHCH$_3$ | 2-(2-methylaminoethoxy)pyridine | L, 69–70 at 0.1 mm | A |
| 110 | pyridine-O-CH(CH$_2$CH$_3$)-CH$_2$-N(CH$_2$CH$_2$) (aziridyl) | 2-(1-N-aziridyl-2-butoxy)pyridine | L, 90–91 at 0.1 mm | A |
| 111 | 4-pyridyl-OCH$_2$CH$_2$N(CH$_2$CH$_2$) | 4-(2-N-aziridylethoxy)pyridine | L, 110–115 at 0.02 mm | A |
| 112 | pyridine-OCH$_2$CH$_2$NH$_2$ | 2-(2-aminoethoxy)pyridine | L, 63–65 at 0.05 mm | A |
| 113 | pyridine-OCH$_2$CH$_2$CH$_2$N(CH$_3$)$_2$ | 2-(3-dimethylamino-n-propyloxy)pyridine | L, 80–83 at 0.1 mm | A |
| 114 | pyridine-OCH$_2$CH$_2$N(CH$_3$)$_2$ | 2-2-dimethylaminoethoxy)pyridine | L, 50–51 at .01 mm | A |
| 115 | phenyl-O-CO$_2$-CH(O-pyridyl)-CH$_2$-N(C(CH$_3$)$_2$CH$_2$) | 2-1-phenoxy-3-(2,2-dimethyl-N-aziridyl)2-propyloxy]pyridine. | L, undistilled | A |
| 116 | pyridine-NH(CH$_2$)$_3$-OCH$_3$ | 2-(3-methoxypropylamino)pyridine | L, 77–79 at 0.05 mm | B |
| 117 | pyridine-NH-(CH$_2$)$_2$OCH$_3$ | 2-(2-methoxyethylamino)pyridine | L, 76–86 at 0.1 mm | B |
| 118 | pyridine-NH(CH$_2$)$_2$OC$_2$H$_5$ | 2-(2-ethoxyethyl-amino)pyridine | S, 36–37 | B |
| 119 | 3-NH$_2$-pyridine-O(CH$_2$)$_2$NH$_2$ | 2-(2-aminoethoxy)-3-aminopyridine | L, 126–135 at 0.03 mm | A |
| 120 | pyridine-CH$_2$OCH$_2$CH$_2$N(CH$_2$CH$_2$) | 2-(2-N-aziridylethoxymethyl)pyridine | L, 85–90 at 0.02 mm | A |
| 121 | 4-pyridyl-CH$_2$OCH$_2$CH$_2$N(CH$_3$)$_2$ | 4-picolyl-2-dimethylaminoethylether | L, 85–90 at 0.01 mm | A |

Table II(a)—Continued

| Example No. | Compound formula | Name | S=Solid, L=Liquid Phys. Prop., °C | Method |
|---|---|---|---|---|
| 122 | 4-pyridyl-CH$_2$OCH$_2$CH$_2$N(CH$_2$CH$_2$) (aziridine) | 4-picolyl-2-N-aziridylethylether | L, 96–101 at 0.03 mm | A |
| 123 | 4-pyridyl-CH$_2$O(CH$_2$)$_2$N$^+$(CH$_3$)$_3$·I$^-$ | 4-picolyl-2-trimethylaminoethylether iodide | S, 127–130 | D |
| 124 | 4-pyridyl-O(CH$_2$)$_2$N(CH$_3$)$_3$$^+$·I$^-$ | 4-(2-trimethylaminoethoxy)pyridine iodide | S, 161–164 | D |
| 125 | 2-OCH$_3$-6-[O(CH$_2$)$_3$N(CH$_3$)$_3$]pyridine ⊕ ⊖ ·I | 2-methoxy-6(3-trimethylamino propoxy) pyridine iodide. | S, 173–177 | D |
| 126 | 2-OCH$_3$-6-[O(CH$_2$)$_2$N(CH$_3$)$_3$]pyridine ⊕ ·I$^⊖$ | 2-methoxy-6(2-trimethylaminoethoxy)-pyridine iodide. | S, 159–161 | D |
| 127 | 2-[O(CH$_2$)$_2$N(CH$_3$)$_3$]pyridine ⊕ I$^⊖$ | 2-(2-trimethylaminoethoxy)pyridine iodide | S, 200–202 | D |
| 128 | 2-Br-6-[S(CH$_2$)$_2$NH$_2$]pyridine | 2-bromo-6-(2-aminothioethoxy)pyridine | L, 96 at 0.1 mm | A |
| 129 | 2-Cl-6-[S(CH$_2$)$_2$NH$_2$]pyridine | 2-chloro-6(2 amino thioethoxy)pyridine | L, oil | A |
| 130 | 2,6-di[O(CH$_2$)$_3$N(CH$_3$)$_3$·I]pyridine | 2,6-di(3-trimethylamino propoxy)pyridine diiodide. | S, 201–205 | D |
| 131 | Cl—pyridyl—OCH$_2$C(CH$_3$)$_2$NH$_2$ | 2-chloro-6(2-methyl-2-aminopropyloxy) pyridine. | L, 85–90 at .025–.01 mm | A |
| 132 | Br—pyridyl—OCH$_2$C(CH$_3$)$_2$NH$_2$ | 2-bromo-6(2-methyl-2-aminopropyloxy) pyridine. | L, 106–109 at 0.025 mm | A |
| 133 | Cl—pyridyl—O(CH$_2$)$_4$NH$_2$ | 2-chloro-6(4-aminobutoxy)pyridine | L, 130 at 0.05 mm | A |
| 134 | Cl—pyridyl—OCH(φ)CH$_2$NH$_2$ | 2-chloro-6(1-phenyl-2-aminoethoxy)pyridine | L, oil | A |

TABLE II(a)—Continued

| Example No. | Compound formula | Name | S=Solid, L=Liquid Phys. Prop., ° C. | Method |
|---|---|---|---|---|
| 135 | Br—[pyridine]—OCH($\phi$)CH$_2$HN$_2$ | 2-bromo-6(1-phenyl-2-aminoethoxy)pyridine | ....do.... | A |
| 136 | CH$_3$—[pyridine]—OCH$_2$CH$_2$NH$_2$ | 2-methyl-6(2-aminoethoxy)pyridine | L, 53–60 at 0.05 mm | A |
| 137 | Br—[pyridine]—OCH$_2$CH$_2$NH$_2$ | 2-bromo-6(2-aminoethoxy)pyridine | L, 96 at 0.1 mm | A |
| 138 | Cl—[pyridine]—O(CH$_2$)$_3$NH$_2$ | 2-chloro-6(3-amino propoxy)pyridine | L, 110–114 at .05–.1 mm | A |
| 139 | Br—[pyridine]—O(CH$_2$)$_3$NH$_2$ | 2-bromo-6(3-amino propoxy)pyridine | L, 105–115 at .01–.1 mm | A |
| 140 | [pyridine-Cl]—OCH$_2$CH$_2$NH$_2$ | 2(2-aminoethoxy)-3-chloropyridine | S | A |
| 141 | Cl—[pyridine]—OCH(CH$_3$)CH$_2$NH$_2$ | 2-chloro-6(2-aminoisopropoxy)pyridine | L, 80–86 at 0.6 mm | A |
| 142 | Cl—[pyridine]—O(CH$_2$)$_2$O(CH$_2$)$_2$NH$_2$ | 2-chloro-6(2-aminoethoxy)ethoxypyridine | L, 104–114 at .05–.07 mm | A |
| 143 | Cl—[pyridine]—O(CH$_2$)$_2$NHCH$_3$ | 2-chloro-6(2-methylaminoethoxy)pyridine | L, 75–85 at .2–.3 mm | A |
| 144 | EtO—[pyridine]—O(CH$_2$)$_2$N$^\oplus$(CH$_3$)$_3$ I$^\ominus$ | 2-ethoxy-6(2-trimethylaminoethoxy)pyridine | S, 258–260 | D |
| 145 | Cl—[pyridine]—OCH$_2$CH$_2$NH$_2$ | 2(2-aminoethoxy)-5-chloropyridine | S, 57–59 | A |
| 146 | $\phi$CH$_2$O—[pyridine]—OCH$_2$CH$_2$NH$_2$ | 2-benzyloxy-6-(2-aminoethoxy)pyridine | S, 114 | A |
| 147 | Br—[pyridine]—OCH$_2$CH$_2$NH$_2$ | 2(2-aminoethoxy)-5-bromopyridine | S, 97–101 | A |
| 148 | O(CH$_2$)$_2$N(CH$_3$)$_3$$^\oplus$·I$^\ominus$ [pyridine-Cl] | 2-chloro-6(2-trimethylaminoethoxy)pyridine iodide. | S, 197–200 | D |

EXAMPLE 149

In this example, 2-chloro-6-benzylthio-pyridine was prepared by the following experimental procedure.

To a solution of sodium ethoxide (271 g.; .35 mole) in 250 ml. of ethanol was added dropwise benzyl mercaptan (37.0 g.; 0.30 mole). The mixture was allowed to stir overnight and the ethanol was distilled off at atmospheric pressure. To the resulting paste was added 200 ml. of toluene and the mixture brought to reflux. A solution of 2,6-dichloropyridine (44.3 g.; 0.3 mole) in 60 ml. to toluene was added rapidly to the refluxing mixture and allowed to reflux overnight. The cooled mixture was partitioned between chloroform and water and the organic layer dried with magnesium sulfate, filtered, and evaporated in vacuo to yield a thick oil which was vacuum distilled to yield 2-chloro-6-benzylthiopyridine B.P.$_{0.01}$ 145–150°.

*Analysis.*—Calcd. for $C_{12}H_{12}ClNS$ (percent): Cl, 15.1; S, 13.6. Found (percent): Cl, 14.69; S, 13.8.

EXAMPLE 150

In this example, several compounds exemplified in Table I were tested as soil fungicide in accordance with the following test procedure. The results of this test are shown in Table III.

The test organisms, which were Rhizoctonia, Pythium, Fusarium and Sclerotium, were raised in sterile soil cultures to which 10% corn meal was added. The soil used for dilution purposes was separately sterilized with methyl bromide. The soil used for test purposes was prepared by mixing 10% by weight of infested soil with 90% by weight of the sterilized soil. The test soil was then apportioned in 50 gram quantities to four paper cups for each organism. The soil was treated with a candidate chemical by drenching each cup separately with 10 ml. of a candidate material prepared as a 50% wettable powder. The chemical concentration was adjusted to give a dosage of 100 p.p.m. based on weight of the soil. The cups on trays were then held in the constant temperature-humidity chamber for the duration of the test. In the absence of control, masses of white mycelia developed on the surface of the test vessel and control was readily evident by the absence of such growth. A rating scale of 0 to 10 was used, in which 0 was indicative of no control of the growth or complete coverage of the soil surface and 10 was indicative of complete control or no mycelial growth.

TABLE III

| Cmpd. | 21 | 9 | 36 | Control[1] |
|---|---|---|---|---|
| | Dose (p.p.m.) | | | |
| | 100 | 100 | 100 | 100 |
| Pythium | 8 | 0 | 6 | 10 |
| Rhizoctonia | 8 | 4 | 0 | 8 |
| Sclerotium | 0 | 8 | 6 | 8 |
| Fusarium | 8 | 4 | 0 | 8 |

[1] Lanstan is 1-chloro-2-nitropropane.

following test procedures. The results of this test are shown in Tables IV and V.

Test procedure for measuring pre-emergent herbicidal activity

Flats were planted to the desired crops to a depth of approximately ½ inch. The crops employed were pigweed, crabgrass, foxtail, mustard, Johnson grass, cotton, soybean, oats, corn, tomato, morning glory, and lamb's-quarter. The chemicals were initially screened at a dosage of 10 lbs. of active ingredient per acre. Candidate materials as 25% wettable powders were extended in water and 250 ml. of such a suspension uniformly distributed over each flat. The flats were immediately transferred to the greenhouse and covered for a period of three days so that additional watering was not required until some of the plants began to make their appearance above the ground. The flats were then held for 21 days before recording emergence and final phytotoxicity effects was affected. Phytotoxicity data were recorded on a scale of 0 to 10 in which 0 indicated no injury and 10 indicated the plant was killed. Karmex is used as a standard in this test.

TABLE IV

| Cmpd. | Lbs., acre | Cotton | Soybean | Tomato | Corn | Oats | Pigweed | Mustard | Morning Glory | Lamb's quarter | Crabgrass | Foxtail | Johnson grass |
|---|---|---|---|---|---|---|---|---|---|---|---|---|---|
| 36 | 10 | 0 | 3 | 7 | 2 | 5 | 9 | 10 | 8 | 10 | 10 | 2 | 0 |
| 8 | 10 | 8 | 8 | 9 | 5 | 5 | 8 | 10 | 10 | 10 | 10 | 10 | 10 |
| 7 | 10 | 7 | 9 | 10 | 7 | 6 | 10 | 10 | 10 | 10 | 10 | 10 | 9 |
| 137 | 10 | 9 | 9 | 10 | 7 | 7 | 10 | 10 | 10 | 10 | 10 | 10 | 10 |
| 9 | 10 | 3 | 7 | 9 | 2 | 2 | 10 | 10 | 9 | 10 | 10 | | 9 |
| 21 | 10 | 2 | 6 | 7 | 6 | 8 | 10 | 10 | 7 | 10 | 9 | | 9 |
| 41 | 10 | 7 | 2 | 5 | 4 | 5 | 7 | 7 | 9 | 9 | 10 | | 8 |
| 5 | 10 | 9 | 8 | 9 | 6 | 7 | 10 | 9 | 9 | 10 | 10 | | 8 |
| Karmex[1] | 2 | 2 | 6 | 10 | 4 | 4 | 10 | 10 | 10 | 10 | 10 | 10 | 7 |

[1] Karmex is (also known as Diuron) 3-(3,4-dichlorophenyl)-1,1-dimethylurea.

Test procedure for measuring post-emergent herbicidal activity

The crops employed in this post-emergence herbicidal evaluation were pigweed, crabgrass, foxtail, mustard, Johnson grass, cotton, soybean, oats, corn, tomato, morning glory and red kidney beans. Cotton was normally in the 4–6 week stage at the time of spray application. The kidney beans had well expanded sets of first true leaves. Tomatoes were normally two weeks of age. Johnson grass was approximately 2 inches in height. Chemicals were formulated as 50% wettable powders and extended in water to the desired concentration. Candidate materials were screened at 5 lbs./acre active ingredient calculated on a broadcast basis. The plants were normally scored for phytotoxicity 10–12 days after spray application. Phytotoxicity ratings were based on a scale of 0–10, in which 0 indicated no injury and 10 indicated that the plants were killed. Diuron is used as a standard in this test.

TABLE V

| Cmpd. | Lbs., acre | Cotton | Soybean | Tomato | Corn | Oats | Pigweed | Mustard | Morning glory | Red kidney bean | Crabgrass | Foxtail | Johnson grass |
|---|---|---|---|---|---|---|---|---|---|---|---|---|---|
| 35 | 5 | 2 | 4 | 10 | 0 | 0 | 2 | 10 | 10 | 8 | 0 | 0 | 0 |
| 8 | 5 | 2 | 5 | 10 | 0 | 2 | 4 | 9 | 8 | 4 | 8 | 6 | 7 |
| 7 | 5 | 4 | 4 | 10 | 2 | 4 | 4 | 8 | 8 | 7 | 5 | 2 | 6 |
| 21 | 5 | 3 | 8 | 10 | 2 | 2 | 6 | 9 | 6 | 7 | 9 | 9 | 6 |
| 5 | 5 | 6 | 10 | 10 | 10 | 1 | 8 | 9 | 8 | 10 | 5 | 9 | 5 |
| Karmex | 2 | 6 | 8 | 10 | 9 | 4 | 10 | 10 | 10 | 10 | 9 | 10 | 8 |

EXAMPLE 151

In this example, 8 different compounds selected from Tables I and II were tested for herbicidal activity, both pre-emergent and post-emergent, in accordance with the

EXAMPLE 152

In this example, several compounds exemplified in Table II were tested as insecticides by exposure of *Drosophila melanogaster* and *Tribolium confusum* to a film of each of the compounds designated on the walls of 200 ml. test tubes.

Drosophila cultures were carried in a routine manner under controlled temperature and humidity conditions. Their breeding and rearing cycle was handled in a manner to assure testing of adults of uniform age. The test materials were deposited within the test tubes (25 mm. x 200 mm.) in a volatile solvent, such as acetone, and immediately mechanically rotated to obtain a thin film of the toxicant on the walls of the test vessels. Ten flies were released into each tube and then stoppered with an absorbent cotton plug holding a protruding tip (dental gum) impregnated with sufficient liquid food to carry them for three days. The dose was 1000 p.p.m.

The test specimens were observed continuously for the first few minutes to determine whether the candidate material possessed "knockdown" properties. Routine counts were then made at 24 and 48 hour intervals and reported as percent mortality.

It is to be noted that the above test can also very readily be modified in procedure to evaluate the residual activity of a material as a thin deposited film; in this event, the film would merely be aged for the required period of time before releasing the flies into the test vessel.

The general test procedure of evaluating the designated chemical for insecticidal activity against *Tribolium confusum* was as follows: First, the chemical to be used was prepared in the form of a 0.1% acetone solution if the materials were acetone soluble. 2 ml. of the chemical to be tested was then deposited uniformly over the floor of a 4 oz. glass jar and the acetone was permitted to evaporate off, leaving a thin film of chemical. Adult confused flour beetles, priorly starved for twenty-four hours, were then placed, ten per jar, on duplicate test vessels. Unless otherwise indicated, the jars were closed during the duration of observation. The dosage was equivalent to 46 mgms. per square foot.

The insects were then examined frequently over the first few hours to observe the effect of the chemicals on their behavior so far as "knockdown" and rapidity of action was concerned. Notes were made on any unusual reactions, such as agitation, paralysis and the approximate time for such effects to occur. Mortality counts were made over a period of 1 and 2 days, respectively.

The results of these tests are shown in Table VI.

TABLE VI.—PERCENT MORTALITY

| Cmpd. | Dose, p.p.m. | Drosophila | | Confused flour beetle | |
|---|---|---|---|---|---|
| | | 24 hrs. | 48 hrs. | 24 hrs. | 48 hrs. |
| 108 | 1,000 | 100 | 100 | 100 | 100 |
| 101 | 1,000 | 0 | 0 | 95 | 100 |
| Kelthane [1] | 1,000 | 100 | 100 | 100 | 100 |

[1] Kelthane is 1,1-bis(p-chlorophenyl)-2,2,2-trichloroethanol.

EXAMPLE 153

In this example, the nematocidal activity of the compounds tested was determined against a species of Panagrellus, an active saprozoic nematode, in accordance with the following test procedure. The results of this test are shown in Table VII.

TABLE VII

| Cmpd. | Dose, p.p.m. | Percent kill | | |
|---|---|---|---|---|
| | | 24 hr. | 72 hr. | 120 hr. |
| 108 | 500 | 100 | 100 | 100 |
| 101 | 500 | 100 | 100 | 100 |
| Nemagon [1] | 500 | 100 | 100 | 100 |

[1] Nemagon is 1,2-dibromo-3-chloropropane.

The nema were collected from the culture medium in a routine manner to insure their freedom from food contamination and uniformity of age by means of a Baerman funnel technique. The screen was carried out in stoppered test tubes containing 10 ml. of the chemical dosage to be tested and the nematode population, at the time of seeding, was adjusted to 50–75 per tube. The test was run in duplicate and the check or blank contained nema in tap water. To be noted is the fact that the nematodes, when properly handled, can survive at least seven days in the blanks without the addition of food. Dosage levels were 500, 50 and 5 p.p.m.

Microscopic observations on the behavior of the nema were made daily over a period of five to seven days to establish the rapidity of action of the chemical and the final end point of kill. The constant and active movement of this species, however, permitted easy identification of live and dead individuals. The rapid and short cycle of reproduction by parthenogensis permitted observation of the effect of the chemicals on reproductive behavior and also on individuals of different ages.

It is thus seen that the compounds of this invention are useful as herbicides, fungicides, insecticides and nematocides. The methods of application in which the mono- or poly-substituted compounds of this invention are employed as herbicide, fungicide, insecticide or nematocide, have been discussed previously in the description of this invention.

While the invention has been described with a certain degree of particularity, various modifications can be made therein without departing from the scope of this invention as defined by the following claims.

What is claimed is:

1. A compound having the following structure

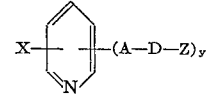

wherein
X is selected from the group consisting of hydrogen, halogen and lower alkoxy;
A is selected from the group consisting of

—N—H—R$^1$

—O— and —O—R$^1$ wherein R$^1$ is lower alkylene having 1 to 3 carbons;
D is selected from the group consisting of

[—C—(R$^2$)$_2$—]$_n$ and (—CH$_2$)$_2$—O—(CH$_2$)$_2$ wherein $n$ is an integer from 1 to 4;
R$^2$ is selected from the group consisting of hydrogen, lower alkyl, cyclopropyl, cyclohexyl, phenyl and benzyl;
Z is selected from the group consisting of —OH, —OR$^3$, —NH$_2$, —NHR$^3$, —N—(R$^3$)$_2$ and —[N$^+$—(R$^3$)$_3$]hal$^-$ wherein R$^3$ is lower alkyl, hal is a halide anion;
$y$ is the integer 1 or 2 with a proviso that when (ADZ)$_y$ represents the

—O—CH$_2$—CH$_2$—N—(CH$_3$)$_2$ radical, X is other than halogen.

2. The compound according to claim 1 wherein the specific compound is 2-chloro-6(2 methoxy propylamino) pyridine.

3. The compound according to claim 1 wherein the specific compound is 2-chloro-6(2 hydroxyethylamino) pyridine.

4. The compound according to claim 1 wherein the specific compound is 2-ethoxy-6(2-trimethylaminoethoxy) pyridine iodide.

5. The compound according to claim 1 wherein the specific compound is 2-methoxy-6(2-methylaminoethoxy) pyridine.

6. The compound according to claim 1 wherein the specific compound is 2-chloro-6(2-aminoethoxy)pyridine.

7. The compound according to claim 1 wherein the specific compound is 2-ethoxy-6-(2-aminoethoxy)pyridine.

8. The compound according to claim 1 wherein the specific compound is 2-bromo-6-(3-methoxypropylamino)pyridine.

9. The compound according to claim 1 wherein the specific compound is 2,6-di(2-trimethylaminoethoxy)pyridine diiodide.

10. The compound according to claim 1 wherein the specific compound is 2-bromo-6-(2-ethoxyethylamino)pyridine.

11. The compound according to claim 1 wherein the specific compound is 2-bromo-6-(2-methylaminoethoxy)pyridine.

12. The compound according to claim 1 wherein the specific compound is 2-bromo-6-(3-methoxypropylamino)pyridine.

13. The compound according to claim 1 wherein the specific compound is 2,6-di(2-dimethylaminoethoxy)pyridine.

14. The compound according to claim 1 wherein the specific compound is 2,6-di(3-dimethylaminopropyloxy)pyridine.

15. The compound according to claim 1 wherein the specific compound is 2,6-di(2-methylaminoethoxy)pyridine.

16. The compound according to claim 1 wherein the specific compound is 2,6-di(2-aminoethoxy)pyridine.

17. The compound according to claim 1 wherein the specific compound is 2-ethoxy-6-(2-methylaminoethoxy)pyridine.

18. The compound according to claim 1 wherein the specific compound is 4-(2-dimethylaminoethoxy)pyridine.

19. The compound according to claim 1 wherein the specific compound is 2-(2-methyl aminoethoxy)pyridine.

20. The compound according to claim 1 wherein the specific compound is 2-(2-aminoethoxy)pyridine.

21. The compound according to claim 1 wherein the specific compound is 2-(3-dimethylamino-n-propyloxy)pyridine.

22. The compound according to claim 1 wherein the specific compound is 2-(2-dimethylaminoethoxy)pyridine.

23. The compound according to claim 1 wherein the specific compound is 2-(3-methoxypropylamino)pyridine.

24. The compound according to claim 1 wherein the specific compound is 2-(2-methoxyethylamino)pyridine.

25. The compound according to claim 1 wherein the specific compound is 2-(2-ethoxyethylamino)pyridine.

26. The compound according to claim 1 wherein the specific compound is 2-(2-aminoethoxy)-3-aminopyridine.

27. The compound according to claim 1 wherein the specific compound is 2-(2-N-aziridylethoxymethyl)pyridine.

28. The compound according to claim 1 wherein the specific compound is 4-picolyl-2-dimethyl aminoethyl ether.

29. The compound according to claim 1 wherein the specific compound is 4-picolyl-2-trimethylaminoethyl ether iodide.

30. The compound according to claim 1 wherein the specific compound is 4-(2-trimethylaminoethoxy)pyridine iodide.

31. The compound according to claim 1 wherein the specific compound is 2-methoxy-6-(3-trimethylaminopropoxy)pyridine iodide.

32. The compound according to claim 1 wherein the specific compound is 2-methoxy-6-(2-trimethylaminoethoxy)pyridine iodide.

33. The compound according to claim 1 wherein the specific compound is 2-(2-trimethylaminoethoxy)pyridine iodide.

34. The compound according to claim 1 wherein the specific compound is 2,6-di(3-trimethylaminopropoxy)pyridine diiodide.

35. The compound according to claim 1 wherein the specific compound is 2-chloro-6-(2-methyl-2-aminopropyloxy)pyridine.

36. The compound according to claim 1 wherein the specific compound is 2-bromo-6-(2-methyl-2-aminopropyloxy)pyridine.

37. The compound according to claim 1 wherein the specific compound is 2-chloro-6-(4-aminobutoxy)pyridine.

38. The compound according to claim 1 wherein the specific compound is 2-chloro-6-(1-phenyl-2-aminoethoxy)pyridine.

39. The compound according to claim 1 wherein the specific compound is 2-bromo-6-(1-phenyl-2-aminoethoxy)pyridine.

40. The compound according to claim 1 wherein the specific compound is 2-methyl-6-(2-aminoethoxy)pyridine.

41. The compound according to claim 1 wherein the specific compound is 2-bromo-6-(2-aminoethoxy)pyridine.

42. The compound according to claim 1 wherein the specific compound is 2-chloro-6-(3-aminopropoxy) pyridine.

43. The compound according to claim 1 wherein the specific compound is 2-bromo-6-(3-aminopropoxy)pyridine.

44. The compound according to claim 1 wherein the specific compound is 2-(2-aminoethoxy)-3-chloropyridine.

45. The compound according to claim 1 wherein the specific compound is 2-chloro-6-(2-aminoisopropoxy)pyridine.

46. The compound according to claim 1 wherein the specific compound is 2-chloro-6-(2-aminoethoxy)ethoxypyridine.

47. The compound according to claim 1 wherein the specific compound is 2-chloro-6-(2-methylaminoethoxy)pyridine.

48. The compound according to claim 1 wherein the specific compound is 2-ethoxy-6-(2-trimethylaminoethoxy)pyridine.

49. The compound according to claim 1 wherein the specific compound is 2-(2-aminoethoxy)-5-chloropyridine.

50. The compound according to claim 1 wherein the specific compound is 2-benzyloxy-6-(2-aminoethoxy)pyridine.

51. The compound according to claim 1 wherein the specific compound is 2-(2-aminoethoxy)-5-bromopyridine.

52. The compound according to claim 1 wherein the specific compound is 2-chloro-6-(2-trimethylaminoethoxy)pyridine iodide.

References Cited

Schuler et al.: Chem. Abstracts, vol. 60, par. 14, 515, 1960.

ALAN L. ROTMAN, Primary Examiner

U.S. Cl. X.R.

71—94; 260—294.8, 295; 424—263, 266